G. L. SCOTT.
CAR BRAKE.
APPLICATION FILED MAY 8, 1918
1,307,422.
Patented June 24, 1919.
3 SHEETS—SHEET 1.
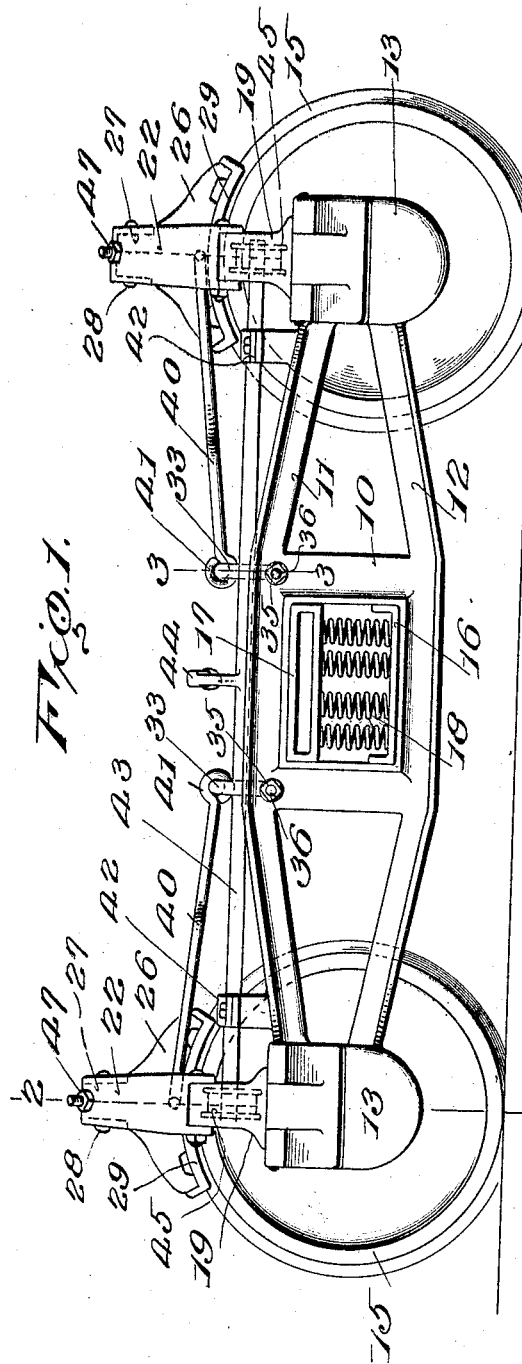
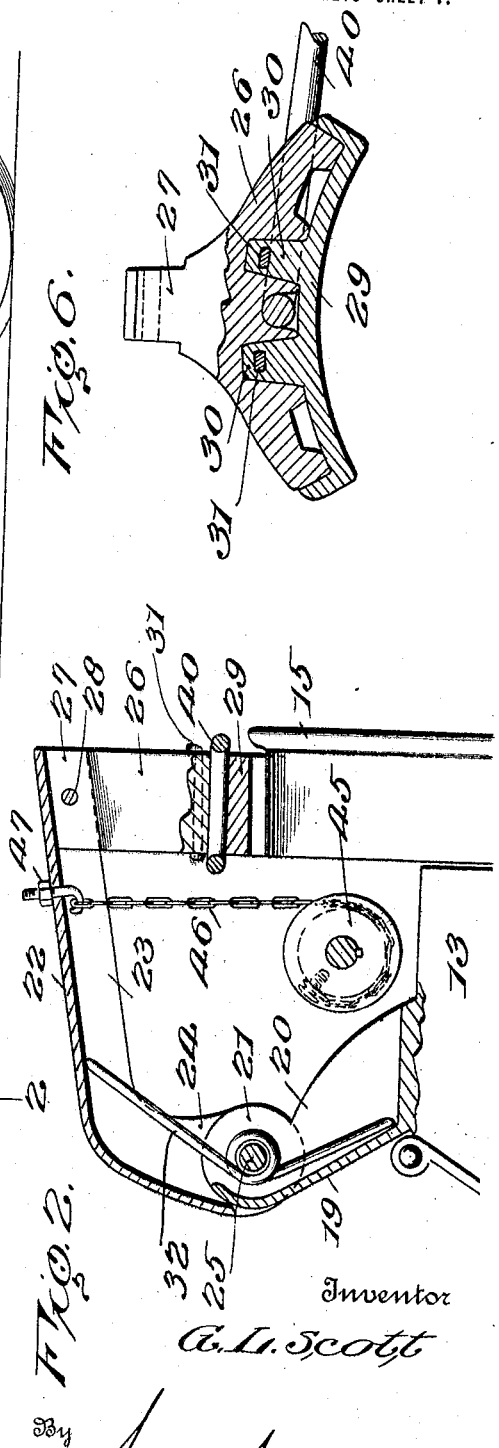
Inventor
G. L. Scott
By Loewy & Loewy, Attorney

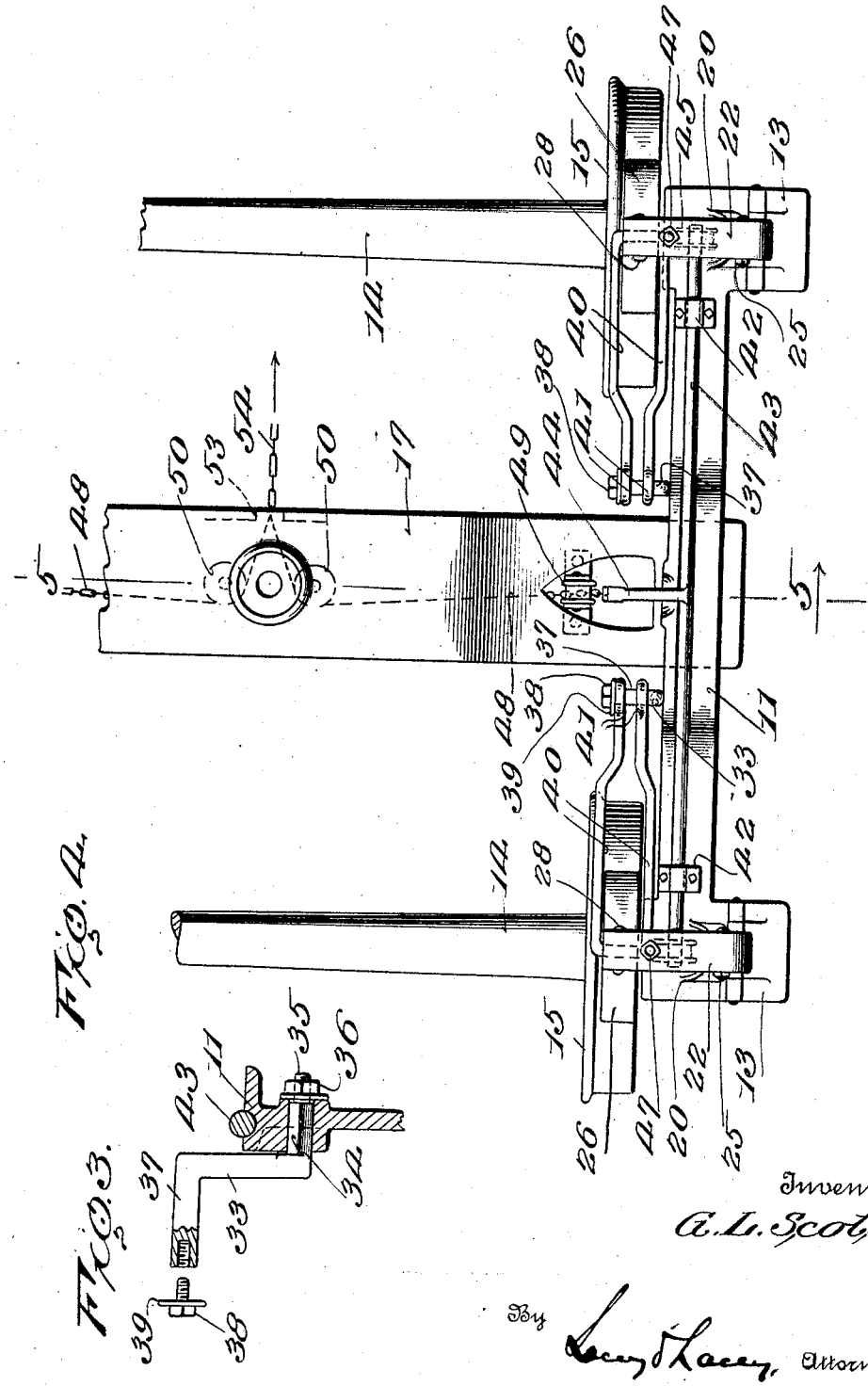

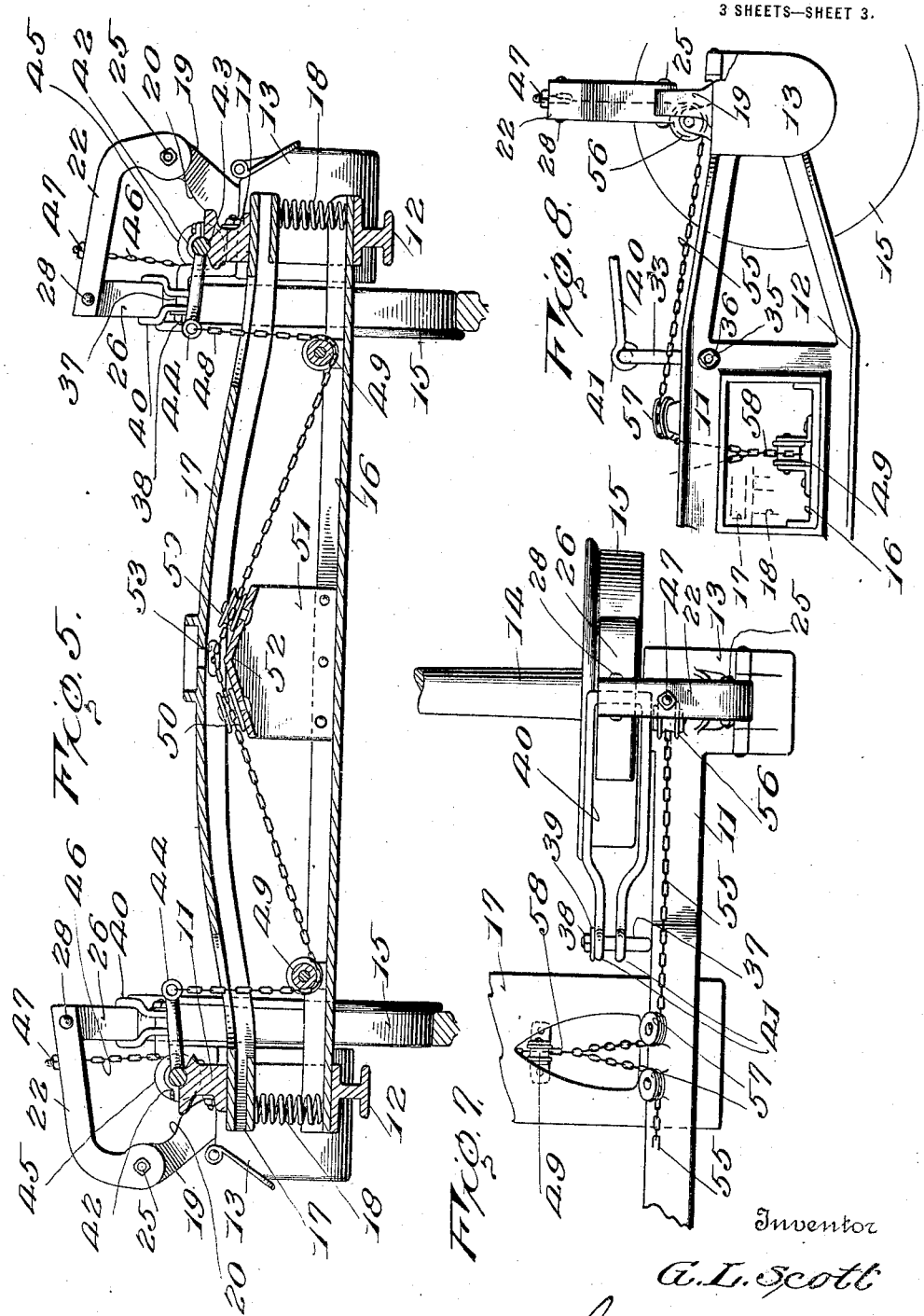

UNITED STATES PATENT OFFICE.

GEORGE L. SCOTT, OF SHAWNEE, OKLAHOMA.

CAR-BRAKE.

1,307,422.   Specification of Letters Patent.   Patented June 24, 1919.

Application filed May 8, 1918. Serial No. 233,236.

*To all whom it may concern:*

Be it known that I, GEORGE L. SCOTT, citizen of the United States, residing at Shawnee, in the county of Pottawatomie and State of Oklahoma, have invented certain new and useful Improvements in Car-Brakes, of which the following is a specification.

This invention relates to an improved car brake of the general type shown in Patent No. 1,249,675, issued to me December 11, 1917, and has as its primary object to provide a construction wherein the brake will be mounted to bear on top of the car wheels and connected with the car truck frames to lift upwardly thereon in proportion to the pressure applied to the brakes for thus relieving the journals of the wheels of a corresponding portion of the weight of the load and tending to prevent locking of the wheels by the brake.

The invention has as a further object to provide an improved type of brake hanger bracket and brake hanger for supporting the brake heads of the shoes above the car wheels.

And the invention has as a still further object to provide an improved mechanism for actuating the brake.

Other and incidental objects will appear as the description proceeds. In the drawings wherein I have illustrated the preferred embodiment of the invention, and wherein similar reference characters designate corresponding parts throughout the several views:

Figure 1 is an end elevation showing a conventional type of car truck equipped with my improved brake, Fig. 2 is a fragmentary sectional view taken on the line 2—2 of Fig. 1 and more particularly showing the construction and mounting of the brake hanger brackets and brake hangers, Fig. 3 is a fragmentary sectional view taken on the line 3—3 of Fig. 1 and showing one of the anchoring brackets for the thrust members of the brake hanger brackets, Fig. 4 is a fragmentary plan view particularly illustrating the disposition of one of the rock shafts employed for actuating the brakes at each side of the truck, Fig. 5 is a longitudinal sectional view taken through the spring plank of the truck on the line 5—5 of Fig. 4 and showing the manner in which the rock shafts at opposite ends of the transom are connected to be simultaneously actuated, Fig. 6 is a detail sectional view taken through one of the brake heads and particularly showing the mounting of the brake shoe thereon, Fig. 7 is a fragmentary plan view showing a slightly modified form of actuating mechanism for the brake hangers, and Fig. 8 is a fragmentary end elevation of the modification shown in Fig. 7.

In order that the construction, mounting and operation of my improved brake may be accurately understood I have, in the drawings, shown the brake in connection with a conventional type of car truck including side frames 10 which have upper and lower arch bars 11 and 12 respectively, at the ends of which are supported the journal boxes 13. Extending between the journal boxes at opposite ends of the side frames are the wheel axles 14 carrying the truck wheels 15. Mounted upon the side frames medially thereof, to extend between the said frames is a spring plank 16 with which is associated a bolster 17 yieldably supported at its ends from the spring plank by suitable bolster springs 18.

Coming now more particularly to the subject of the present invention, I employ brake hanger brackets 19 which are rested upon the upper sides of the journal boxes 13 and are secured thereto in any approved manner. These brackets incline upwardly and outwardly away from the truck wheels and are formed with side flanges 20 terminating at their upper ends in spaced lugs or pivot ears 21. Swingingly supported by the brackets 19 are brake hangers 22. These hangers are provided with side flanges 23 which, at the inner ends of the said hangers, extend laterally and downwardly therefrom to provide lugs or pivot ears 24 mating with the lugs 21 of the brackets. Extending through these mating lugs and pivotally connecting the brake hangers with the said brackets are pivot pins 25. As particularly shown in Fig. 2 of the drawings the brackets extend upwardly from the journal boxes in a plane above the upper sides of the truck wheels and support the brake hangers to extend laterally and inwardly therefrom over the said wheels. Mounted upon the outer ends of the brake hangers 22 above the truck wheels are brake heads 26 formed upon the upper sides thereof with lugs 27 snugly fitting between the side flanges 23 of the brake hangers and receiving transverse connecting pins 28 extending through the said flanges and securing the brake heads in position upon the hangers. Detachably connected to the brake heads are brake shoes 29 provided at their ends with upstanding lugs engaging the ends of the brake heads and formed intermediate of their length with spaced upstanding key loops 30 fitting in suitable recesses in the lower faces of the brake heads. Removably fitted through the said brake heads to engage through these loops are keys 31 detachably connecting the brake shoes with the brake heads. As particularly shown in Fig. 2 of the drawings, these keys are preferably inserted from the outer sides of the brake heads and, at their inner ends are bent laterally to hold the said pins against displacement. The brake shoes will thus be rigidly supported upon the brake heads to coöperate with the truck wheels and fitted around the pivot pins 25 of the brake hangers to bear between the said hangers and the hanger brackets 19, are helical springs 32 acting to yieldably hold the brake hangers elevated and consequently also hold the brake shoes away from the truck wheels. As also particularly brought out in Fig. 2, the springs 32 are housed within the brake hangers and the brackets therefor between the side flanges of the said hangers and brackets so that the said springs will be somewhat protected from the weather.

Mounted upon each of the side frames of the truck at opposite sides of the spring plank 16 are anchoring brackets 33 upstanding from the said frames at the inner sides thereof. At their lower ends these brackets are, as particularly shown in Fig. 3, formed with laterally directed squared terminals 34 engaging through suitable openings therefor in the upper arch bars 11 of the frames and provided with reduced threaded extensions 35 receiving nuts 36 connecting the brackets with the said frames. The brackets will thus be firmly connected with the side frames of the truck and rigidly supported in upright position by the squared terminals 34 thereof. Projecting inwardly from the upper ends of the brackets are laterally directed arms 37 into the outer ends of which are axially threaded bolts 38 carrying retaining washers 39. Extending from the brake heads are substantially U-shaped thrust members 40 therefor. The bights of these thrust members are, as particularly shown in Fig. 2, loosely received within suitable transverse grooves in the lower faces of the brake heads to be retained by the brake shoes overlying the said grooves so that the thrust members are thus detachably and swingingly connected with the said brake heads. Adjacent their outer extremities the arms of the thrust members are offset to extend in close parallel relation to each other and, at their adjacent terminals are formed with loops 41 loosely fitting over the arms 37 of the brackets 33 and held thereon by the retaining washers 39 of the bolts 38 of the said arms. Thus, the thrust members may swing upon these arms of the brackets when the brake hangers are raised or lowered while, at the same time, the said members will rigidly hold the brake heads against movement in opposite directions when the brake shoes are engaged with the truck wheels and the brakes thus applied.

Mounted upon the upper arch bars 11 of the side frames of the truck adjacent opposite ends of the said arch bars, are alined upstanding bearings 42 and journaled through these bearings upon each of the said side frames is a longitudinally extending rock shaft 43. As particularly shown in Figs. 1 and 5 of the drawings, the upper edges of the upper arch bars are slightly cut away to freely receive the intermediate portions of the said shafts and projecting from these shafts, at points substantially midway of the ends thereof, are oppositely disposed radial arms 44 extending over the bolster 17. Keyed or otherwise secured upon the terminals of the shafts are pulleys 45 and engaged at their lower ends with these pulleys are chains or other suitable flexible elements 46, the upper ends of which are adjustably connected with the free extremities of the brake hangers by hook bolts 47. The brake hangers at the respective sides of the truck frame are, therefore, connected for simultaneous operation from the corresponding shaft 43, by these chains and, as will be clear, the bolts 47 may be readily adjusted for adjusting the normal position of the brake shoes with respect to the truck wheels. Formed through the bolster 17 beneath the arms 44 of the shafts 43, are suitable openings through which extend chains or other suitable flexible elements 48 connected to the outer ends of the said arms. These chains are passed beneath suitable pulleys 49 mounted upon the spring plank 16 and are thence passed around pulleys 50 supported by an angle plate 51 centrally of said plank. This plate is secured to the spring plank in any approved manner and the free wing 52 thereof is formed with oppositely inclined portions which carry the pulleys 50 so that these pulleys are thus inclined toward opposite ends of the spring plank to properly receive the chains 48 from the pulleys 49 mounted adjacent the ends of the plank. From the pulleys 50, the chains 48 are then continued therebetween and through a suitable opening 53 in the adjacent side flange of the bolster, when the said chains are connected to a common draw chain or other similar element 54. This draw chain is designed for operative connection with the brake cylinders as well as with the hand brakes of the car so that the brakes may be either pneumatically or manually operated.

In operating the brakes a pull upon the chain 54 will, as will be readily understood in view of the preceding description, act through the chains 48 to swing the arms 44 of the shafts 43 downwardly. These shafts will thus be correspondingly rotated to wind the chains 46 upon the pulleys 45 and swing the brake hangers downwardly to bring the brake shoes into engagement with the truck wheels. Since the said shoes are arranged to bear against the upper sides of the wheels, the brakes may be applied with unusual force without likelihood of locking the wheels. Furthermore, since the rock shafts 43 actuating the brake hangers are connected directly with the side frames of the truck, pressure exerted upon the brakes will act through the brake hangers, the chains 46, pulleys 45 and these rock shafts to lift upwardly upon the arch bars 11 and the truck frames for relieving the journal boxes and journals of the wheel axles of a corresponding portion of the load. In this connection it is to be observed that since the rock shafts are each connected with the side frames of the truck adjacent opposite ends thereof, the upward lift exerted by the application of the brakes to the truck wheels will be equally distributed between all of the journal boxes and journals of the truck so that the said journals and the bushings therefor will tend to wear uniformly.

In Figs. 7 and 8 of the drawings I have illustrated a slight modification of the invention which relates more particularly to the mechanism employed for actuating the brake hangers. The rock shafts of the preferred construction are eliminated and in lieu thereof chains or other suitable flexible elements 55 are connected directly with the hook bolts 47 of the brake hangers. These chains are first passed beneath suitable pulleys 56 mounted upon the journal boxes 13 beneath the brake hangers and are then carried along the upper arch bars 11 of the side frames of the truck and passed around suitable pulleys 57 mounted upon the said arch bars opposite the openings in the bolster 17. Beyond the pulleys 57 the chains 55 are then connected with chains 58 corresponding to the chains 48 of the preferred construction and passed beneath the pulleys 49 and around the pulleys 50. Otherwise, this modified construction conforms to the preferred embodiment of the invention and, as will be seen, pull upon the chains 58, as previously described, will act through the chains 55 to swing the brake hangers downwardly and bring the brake shoes against the upper sides of the truck wheels.

Having thus described the invention, what is claimed as new is:

1. A car brake including brake hanger brackets mounted upon a truck of the car, independent brake hangers swingingly connected to said brackets to project over corresponding wheels of the truck, brake heads carried by the said hangers, and means connected with the truck and operatively engaged with the said hangers for simultaneously swinging the hangers to shift the brake heads toward the said truck wheels, said means being detachably connected with the hangers whereby either hanger may be operated independently of the other.

2. A car brake including brake hanger brackets mounted upon a truck of the car, brake hangers swingingly connected to said brackets to project over corresponding wheels of the truck, a rock shaft mounted upon the truck, an operative connection between the said shaft and the hangers, and means for rocking the shaft for simultaneously swinging the hangers to shift the brake heads toward the said truck wheels.

3. A car brake including brake hanger brackets mounted upon a truck of the car, brake hangers swingingly connected to said brackets to project over corresponding wheels of the truck, a rock shaft mounted upon the truck, means operatively connecting said hangers with the rock shaft and adjustably engaged with the hangers for regulating the normal position of the brake heads with respect to the said truck wheels, and means for rocking the shaft for simultaneously swinging the hangers to shift the brake heads toward the said truck wheels.

4. A car brake including brake hanger brackets mounted upon a truck of the car, brake hangers swingingly connected to said brackets to project over corresponding wheels of the truck, brake heads carried by the said hangers, a rock shaft mounted upon the truck, pulleys carried by the said shaft, flexible elements engaged with the said pulleys and connected with the brake hangers for simultaneously actuating the hangers from the rock shaft, and means for rocking the said shaft to swing the brake hangers and shift the brake heads toward the said truck wheels.

5. A car brake including brake hanger brackets mounted upon a truck of the car, brake hangers swingingly connected to said brackets to project over corresponding wheels of the truck, brake heads carried by the said hangers, a rock shaft mounted upon the truck, flexible elements connected with the said shaft, means connecting the said flexible elements with the brake hangers and adjustable for varying the normal position of the brake heads with respect to the said truck wheels, and means for rocking the said shaft to simultaneously swing the brake hangers and shift the brake heads toward the said truck wheels.

6. A car brake including brake hanger brackets mounted upon a truck of the car, brake hangers swingingly connected to said brackets to project over corresponding wheels of the truck at one side thereof, brake heads carried by the said hangers, anchoring brackets fixed upon the truck, substantially U-shaped thrust members having their bights swingingly engaged with the said brake heads and pivotally connected at the outer ends of the arms thereof with the said anchoring brackets, and means for simultaneously swinging sand hangers to shift the brake heads toward the said truck wheels.

7. A car brake including brake hanger brackets mounted upon a truck of the car, brake hangers swingingly connected to said brackets to project over corresponding wheels of the truck, brake heads carried by said hangers, and independent means each connected with one of the hangers and operatively coupled together and with the truck for simultaneously swinging the hangers to shift the brake heads toward said truck wheels.

8. A car brake including brake hanger brackets mounted upon a truck of the car, brake hangers swingingly connected to said brackets to project over corresponding wheels of the truck, brake heads carried by said hangers, and means disposed below the hangers and operatively connected therewith and with the truck for simultaneously swinging the hangers to shift the brake heads toward said truck wheels.

9. A car brake including brake hanger brackets mounted upon a truck of the car, brake hangers swingingly connected to said brackets to project over corresponding wheels of the truck, brake heads carried by said hangers, flexible means each connected to one of said hangers, and means operatively coupling said flexible means for simultaneously swinging the hangers to shift the brake heads toward said truck wheels.

10. A car brake including brake hanger brackets mounted upon a truck of the car, brake hangers swingingly connected to said brackets to project over corresponding wheels of the truck, brake heads carried by said hangers, yieldable means housed within the brackets and bearing between the brackets and hangers for normally holding the brake heads away from said truck wheels, and means operatively connected with the truck and with said hangers for simultaneously swinging the hangers to shift the brake heads toward said wheels.

11. A car brake including substantially channel shaped brake hanger brackets mounted upon a truck of the car, substantially channel shaped brake hangers swingingly connected to said brackets to project over corresponding wheels of the truck, brake heads carried by said hangers, yieldable means housed within the channels of the brackets and hangers and bearing therebetween for normally holding the brake heads away from said wheels, and means operatively connected with the truck and with the hangers for simultaneously swinging the hangers to shift the brake heads toward said wheels.

In testimony whereof I affix my signature.

GEORGE L. SCOTT. [L. S.]

Copies of this patent may be obtained for five cents each, by addressing the "Commissioner of Patents, Washington, D. C."